(12) United States Patent
Takamuro et al.

(10) Patent No.: US 11,020,733 B2
(45) Date of Patent: Jun. 1, 2021

(54) HONEYCOMB STRUCTURE (71) Applicant: NGK Insulators, Ltd., Nagoya (JP)

(72) Inventors: Yuki Takamuro, Nagoya (JP); Takashi Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/739,597

(22) Filed: Jan. 10, 2020

(65) Prior Publication Data

US 2020/0230588 A1     Jul. 23, 2020

(30) Foreign Application Priority Data

Jan. 23, 2019   (JP) .............................. JP2019-009669

(51) Int. Cl.
  *B01D 46/24*    (2006.01)
  *B01J 35/04*    (2006.01)
  *B01D 53/88*    (2006.01)
  *C04B 38/00*    (2006.01)

(52) U.S. Cl.
  CPC ............ *B01J 35/04* (2013.01); *B01D 53/885* (2013.01); *C04B 38/0009* (2013.01); *B01D 2255/92* (2013.01)

(58) Field of Classification Search
  None
  See application file for complete search history.

(56) References Cited

U.S. PATENT DOCUMENTS

| 2018/0280956 A1* | 10/2018 | Iida ................... B01D 46/2474 |
| 2018/0280958 A1* | 10/2018 | Ogata ................ B01D 46/2429 |
| 2018/0280959 A1* | 10/2018 | Ogata ................... F01N 3/2828 |
| 2018/0280961 A1* | 10/2018 | Aoki .................. B01D 46/2474 |
| 2020/0230587 A1* | 7/2020 | Beall ..................... F01N 3/2828 |

FOREIGN PATENT DOCUMENTS

JP          S62-266298 A1    11/1987

OTHER PUBLICATIONS

Hyung Suk Kang, Analysis of Reversed Trapezoidal Fins using a 2-D Analytical Method, 2015, University Journal of Mechanical Engineering, 202-207 (Year: 2015).*

* cited by examiner

*Primary Examiner* — Humera N. Sheikh
*Assistant Examiner* — Mary I Omori
(74) *Attorney, Agent, or Firm* — Burr & Brown, PLLC (57) ABSTRACT

A honeycomb structure includes a pillar-shaped honeycomb structure body having porous partition walls surrounding a plurality of cells which extend from a first to a second end face and which form flow channels of a fluid, and a circumferential wall enclosing the partition walls, wherein, specific cell of the cells is provided with a pair of projection which projects into the cell from the partition wall, the projection projects, in at least a pair of opposed partition walls among the partition walls constituting the cell, into the cell from a first and a second side, and which is provided continuously in a direction the cell extends, and in the case where the width of a top part of the projection is denoted by W1, and the width of a bottom part of the projection is denoted by W2, W1>W2 holds, and W2/W1 is 0.5 to 0.9.

5 Claims, 6 Drawing Sheets

HONEYCOMB STRUCTURE

The present application is an application based on JP 2019-009669 filed on Jan. 23, 2019 with Japan Patent Office, the entire contents of which are incorporated herein by reference.

BACKGROUND OF THE INVENTION

Field of the Invention

The present invention relates to a honeycomb structure and more particularly to a honeycomb structure that can be suitably used especially as a catalyst carrier loaded with a catalyst for purifying an exhaust gas.

Description of the Related Art

In recent years, awareness throughout society regarding environmental issues has been increasing. Hence, in the field of technology for generating motive power by burning a fuel, there have been developed various techniques for removing a harmful component, such as nitrogen oxide, from an exhaust gas produced when the fuel is burnt. For example, various techniques for removing a harmful component, such as nitrogen oxide, from an exhaust gas emitted from an engine of an automobile have been developed. In general, to remove such a harmful component from an exhaust gas, a catalyst is used to cause the harmful component to have a chemical reaction to turn the harmful component into another component that is relatively harmless. As a catalyst carrier to be loaded with a catalyst for purifying an exhaust gas, a honeycomb structure is used.

Hitherto, there has been proposed a honeycomb structure provided with a honeycomb structure body having porous partition walls that define a plurality of cells forming the flow channels of a fluid. As this type of honeycomb structure, there has been proposed a honeycomb structure provided with fins that project inward from the partition walls to increase the geometric surface areas of the partition walls (refer to, for example, Patent Document 1).

[Patent Document 1] JP-A-62-266298

The honeycomb structure described in Patent Document 1 can increase the geometric surface areas of the partition walls by the fins provided on the partition walls. However, the fins arranged as described in Patent Document 1 inconveniently occupy a large part of the spaces to be used as the flow channels in the cells, thus easily leading to the stagnation of a gas flow. This has been posing a problem in that the gas flow is locally concentrated in one cell, causing emissions to worsen especially under a high load during a driving mode travel of an automobile.

SUMMARY OF THE INVENTION

The present invention has been made in view of the problem with the prior art described above. The present invention provides a honeycomb structure that can be suitably used especially as a catalyst carrier to be loaded with a catalyst for purifying an exhaust gas. The present invention provides a honeycomb structure expected, in particular, to suppress the worsening of emissions and to improve purifying performance.

The present invention provides a honeycomb structure described below.

According to a first aspect of the present invention, a honeycomb structure is provided including:

a pillar-shaped honeycomb structure body having porous partition walls provided, surrounding a plurality of cells which extend from a first end face to a second end face and which form flow channels of a fluid, and a circumferential wall provided, enclosing the partition walls, wherein, specific cell of the cells is provided with a pair of projection which projects into the cell from the partition wall, the projection projects, in at least a pair of opposed partition walls among the partition walls constituting the cell, into the cell from a first side and a second side, and which is provided continuously in a direction in which the cell extends, and in the case where the width of a top part of the projection is denoted by $W_1$, and the width of a bottom part of the projection is denoted by $W_2$, $W_1 > W_2$ holds, and $W_2/W_1$, which indicates a value obtained by dividing $W_2$ by $W_1$, is 0.5 to 0.9.

According to a second aspect of the present invention, a honeycomb structure according to the first aspect described above is provided, wherein a relationship represented by expression (1) given below is satisfied in the case where a height of the projection is denoted by $H_2$ and an opening width of the cell in a height direction of the projection is denoted by $H_1$ in the cell in which the projection projects:

$$15\% \leq H_2/H_1 \times 100\% \leq 40\% \qquad \text{Expression (1)}$$

According to a third aspect of the present invention, the honeycomb structure according to the first or second aspects described above is provided, wherein in the case where a point at which a perpendicular is drawn down to a first side from a central part in a width direction of the top part of the projection provided on the first side is denoted by P in the specific cell, distances from the point of P to both ends of the first side are denoted by $L_1$ and $L_2$ (provided that $L_1 \geq L_2$), a point at which a perpendicular is drawn down to a second side from a central part in the width direction of the top part of the projection provided on the second side is denoted by Q, and distances from the point of Q to both ends of the second side are denoted by $L_3$ and $L_4$ (provided that $L_3 \geq L_4$), a relationship represented by expression (2) given below is satisfied:

$$L_2/L_1 + L_4/L_3 \geq 1 \qquad \text{Expression (2)}$$

According to a fourth aspect of the present invention, the honeycomb structure according to any one of the first to third aspects described above is provided, wherein a thickness of each of the partition walls is 0.05 to 0.153 mm.

According to a fifth aspect of the present invention, the honeycomb structure according to any one of the first to fourth aspects described above is provided, wherein $W_1$, which denotes the width of the top part of the projection, is 0.0127 to 0.203 mm.

The honeycomb structure in accordance with the present invention has projections provided, projecting in cells, so that the geometric surface areas of the partition walls can be increased by the projections. Further, the projections are configured such that $W_2/W_1$ ranges from 0.5 to 0.9 as described above, thus leading to a relatively greater width of the top part of each projection positioned on the central part side of each cell. Therefore, the area of contact between the projections and a gas can be increased on the central part side of the cell where the flow rate of the gas is higher. Thus, a region in which heat exchange with the projections is actively performed increases, so that the temperature rise performance of the honeycomb structure as a catalyst carrier is expected to improve. Further, in each projection, the width of the bottom part thereof becomes relatively small, so that the entire honeycomb structure has a reduced weight and a lower heat capacity, and further improved temperature rise performance is therefore expected.

DESCRIPTION OF THE PREFERRED EMBODIMENTS

The following will specifically describe embodiments of the present invention with reference to the accompanying drawings. The present invention is not limited to the following embodiments. It should be understood that those obtained by adding alterations, improvements or the like, as appropriate, to the following embodiments on the basis of the ordinary knowledge of one skilled in the art without a departure from the spirit of the present invention fall within the scope of the present invention.

(1) Honeycomb Structure

Figure 1:
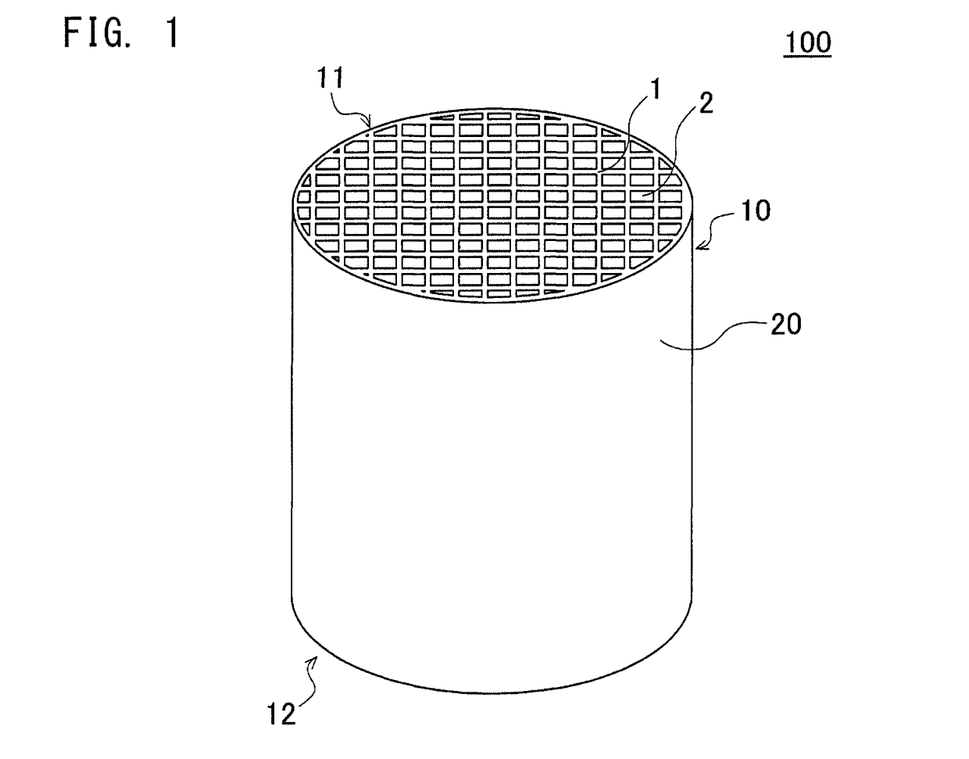
FIG. 1 is a perspective view schematically showing an embodiment of a honeycomb structure in accordance with the present invention.
Figure 2:
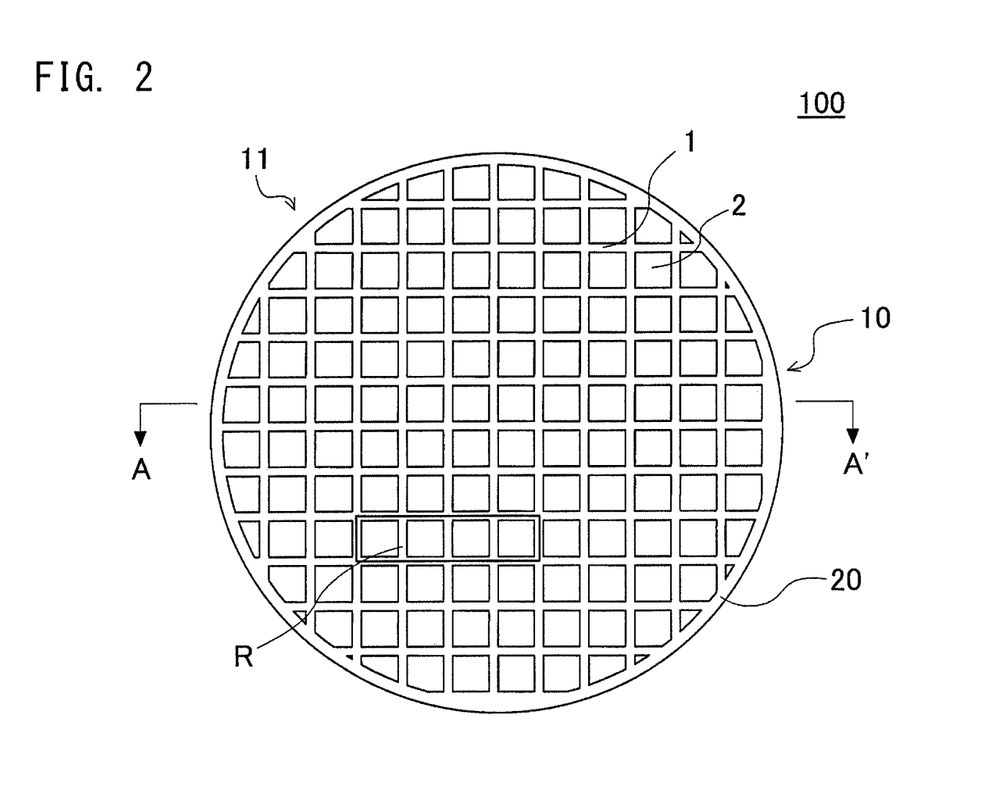
FIG. 2 is a plan view schematically showing the inflow end face of the embodiment of the honeycomb structure in accordance with the present invention.
Figure 3:
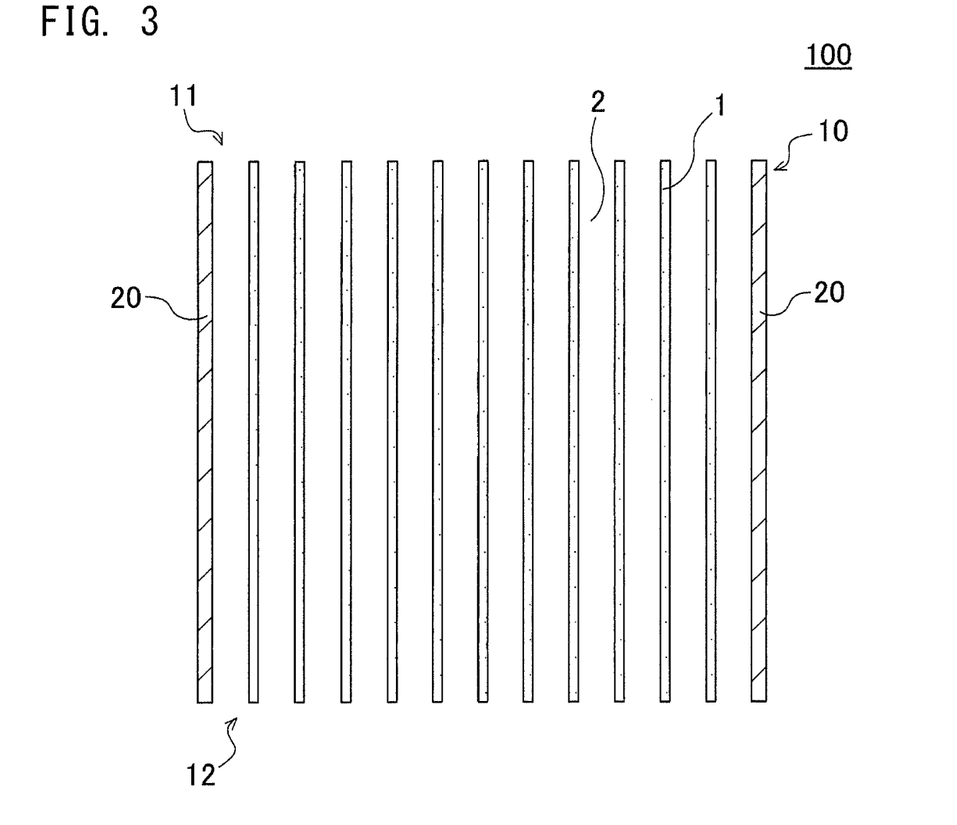
FIG. 3 is a sectional view schematically showing a section taken along line A-A' of FIG. 2.
Figure 4:
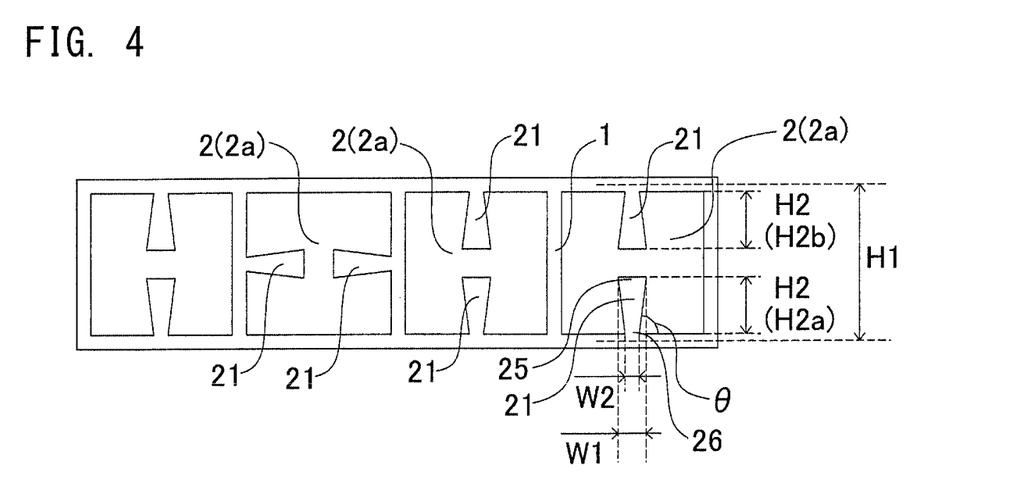
FIG. 4 is a plan view schematically showing, in an enlarged view, a part (region R) of the inflow end face shown in FIG. 2.
Figure 5:
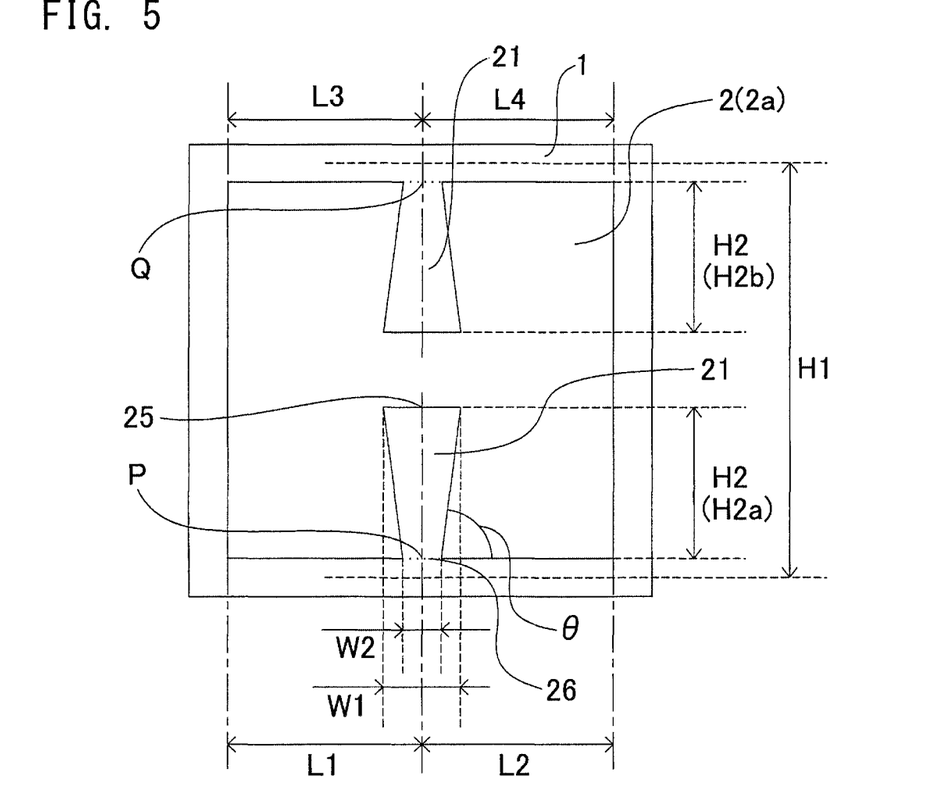
FIG. 5 is a further enlarged plan view of the part shown in FIG. 4.

An embodiment of the honeycomb structure in accordance with the present invention is a honeycomb structure 100 shown in FIG. 1 to FIG. 5. The honeycomb structure 100 includes a pillar-shaped honeycomb structure body 10. FIG. 1 is a perspective view schematically showing an embodiment of the honeycomb structure body in accordance with the present invention. FIG. 2 is a plan view schematically showing the inflow end face of the embodiment of the honeycomb structure in accordance with the present invention. FIG. 3 is a sectional view schematically showing a section taken along line A-A' of FIG. 2. FIG. 4 is a plan view schematically showing, in an enlarged view, a part (region R) of the inflow end face shown in FIG. 2. FIG. 5 is a further enlarged plan view of the part shown in FIG. 4.

The honeycomb structure body 10 has porous partition walls 1 provided, surrounding a plurality of cells 2 that form flow channels of a fluid extending from a first end face 11 to a second end face 12, and a circumferential wall 20 provided, enclosing the partition walls 1. Further, as shown in FIG. 4 and FIG. 5, each of the partition walls 1 has projections 21, 21 which project to extend in each of the cells 2 and which are provided continuously in the direction in which the cell 2 extends. Especially, in the honeycomb structure 100 of the present embodiment, among the partition walls 1 surrounding one cell 2, each of the partition walls 1 constituting two opposed sides with the cell 2 sandwiched therebetween has one projection 21. In the present specification, the "two opposed sides" means two sides having a parallel positional relationship and two sides having a positional relationship in which the angle formed by the two sides is 10 degrees or less. Further, the projections 21, 21 provided, projecting in each cell 2 may be such that, for example, the projecting direction of the projections 21, 21 may be different for each cell 2, as shown in FIG. 4. Referring to FIG. 4, the projections 21, 21 project in the lateral direction on the paper in the second cell 2 from left on the paper, while the projections 21, 21 project in the vertical direction on the paper in the remaining cells 2. This configuration provides a further uniform gas flow and also reduces uneven erosion (a reduction in thickness attributable to the collision of tangible materials that flow in together with an exhaust gas).

In the section of the honeycomb structure body 10, which section is orthogonal to the direction in which the cell 2 extends, the two projections 21, 21 projecting in the cell 2 are configured as described below. If the width of a top part 25 of each of the projections 21 is denoted by W1, and the width of a bottom part 26 of the projection 21 is denoted by W2, then W1>W2 holds, and W2/W1, which indicates a value obtained by dividing W2 by W1, is 0.5 to 0.9. Among the cells 2, the cells 2 having the projections 21 projecting therein may be hereinafter referred to as "specific cells 2a."

The honeycomb structure 100 has the projections 21 which are provided such that the projections 21 project in the specific cells 2a and which satisfy a predetermined condition. Thus, the honeycomb structure 100 can increase the geometric surface area of the partition walls 1. When the honeycomb structure 100 is loaded with a catalyst, the catalyst-loaded area of the honeycomb structure 100 increases by the provided projections 21, as compared with a honeycomb structure that is not provided with the projections 21. As a result, the contact between the catalyst and an exhaust gas is enhanced, thus leading to improved exhaust gas purifying performance. In addition, among the partition walls 1 surrounding one specific cell 2a, only the partition walls 1 that constitute two opposed sides with the specific cell 2a sandwiched therebetween have to be provided with the projections 21, thus making it possible to prevent an excessive increase of the quantity of the projections 21 and to effectively suppress the occurrence of the stagnation of a gas flow. Hence, the honeycomb structure 100 is expected to provide an advantage of preventing emissions from worsening and improving purifying performance.

Further, the projections 21 are configured such that W2/W1 is 0.5 to 0.9 as described above, and the width of the top part 25 of each of the projections 21 positioned on the central part side of the specific cell 2a becomes relatively larger. This makes it possible to increase the area of contact between the projection 21 and a gas on the central part side of the cell 2 at which the gas flow rate is higher. Hence, the region in which heat exchange with the projections 21 is actively carried out increases, thus providing an advantage that the temperature rise performance of the honeycomb structure 100 as a catalyst carrier is expected to improve. In addition, the width of the bottom part 26 of each of the projections 21 is relatively small, thus providing an advantage that the entire honeycomb structure 100 is expected to become lighter, and further improved temperature rise performance is expected due to a reduced heat capacity. The W2/W1 being 0.5 to 0.9 indicates that the value of the ratio of W1:W2 is 1:0.9 to 1:0.5. Hereinafter, W1 may be referred to as "the width W1 of the top part 25" and W2 may be referred to as "the width W2 of the bottom part 26."

In the case where the area occupied by the projections 21 in the specific cell 2a is fixed, if W2/W1 exceeds 0.9, then the width W1 of the top part 25 of each of the projections 21 becomes relatively small, thus making it difficult to increase the area of contact between the projections 21 and a gas on the central part side of the specific cell 2a. Further, in the case where the area occupied by the projections 21 in the specific cell 2a is fixed, if W2/W1 is below 0.5, then the width W1 of the top part 25 of each of the projections 21 relatively becomes excessively large, leading to a higher pressure loss of the honeycomb structure 100. There is no particular restriction on W2/W1 insofar as the ratio remains in the range of 0.5 to 0.9; however, W2/W1 preferably ranges from 0.6 to 0.7.

The width W1 of the top part 25 and the width W2 of the bottom part 26 of each of the projections 21 can be determined according to the method described below. First, the first end face 11 of the honeycomb structure 100 is imaged using a projector (e.g., Profile Projector made by Mitutoyo Corporation). Then, the obtained image is subjected to an image analysis performed by image analysis software (e.g., image analysis software made by Mitutoyo Corporation) thereby to determine the width W1 of the top part 25 and the width W2 of the bottom part 26 of the projection 21. The top part 25 of the projection 21 is an area of 25% of the distal end part thereof in the direction in which the projection 21 extends, and the maximum width in the area is defined as the width W1 of the top part 25 of the projection 21. Further, the bottom part 26 of the projection 21 is an area that is 25% of the proximal end part thereof in the direction in which the projection 21 extends, and the minimum width in the area is defined as the width W2 of the bottom part 26 of the projection 21.

An opening width H1 of the specific cell 2a, a height H2 (H2a or H2b) of the projection 21, and an angle θ formed by a side face of the projection 21, which will be discussed later, can be measured also by using images captured by the foregoing projector. When measuring the height H2 (H2a or H2b) of the projection 21, the distal end (vertex) of the projection 21 is to be positioned farthest in the direction in which the projection 21 extends from the base of the projection 21 in the section that is orthogonal to the direction in which the cell 2 extends. For each measurement, a captured image is preferably enlarged to a desired magnification, as appropriate, before performing measurement.

The honeycomb structure 100 preferably includes the specific cells 2a of 50% or more of all the cells 2. For example, the ratio of the specific cells 2a to all the cells 2 (formula: value calculated by (the quantity of the specific cells 2a/the quantity of all the cells 2)×100%) is preferably 65 to 99% and further preferably 80 to 99%. A ratio of the specific cells 2a to all the cells 2 within the foregoing ranges leads to higher exhaust gas purifying performance. The ratio of the specific cells 2a to all the cells 2 may be set to 100%. If the ratio of the specific cells 2a to all the cells 2 is below the foregoing lower limit, then the purifying performance may deteriorate due to a reduced area of contact with a gas or a difficulty of obtaining the effect of the temperature rise performance provided by the projections 21.

Each of the projections 21 is preferably placed such that a side face of the projection 21 forms the angle θ of 20 to 160 degrees with respect to the surface of each of the partition walls 1. Hereinafter, the angle θ formed by a side face of the projection 21 with respect to the surface of the partition wall 1 may be referred to simply as "the angle θ formed by the side face of the projection 21." The angle θ formed by the side face of the projection 21 is particularly preferably 40 to 70 degrees. The angle θ formed by the side face of the projection 21 that is within the foregoing range makes it difficult for a catalyst to accumulate at the proximal end of the projection 21 when applying the catalyst (when providing catalyst coating). Therefore, the surface area can be increased after the catalyst is applied (after the catalyst coating), thus leading to improved exhaust gas purifying performance. The angle θ formed by the side face of the projection 21 is defined as the angle formed by the tangent of the side face of the projection 21 and an extended line of the base of the projection 21 at a position of half the height of the projection 21 in the section that is orthogonal to the direction in which cells 2 extend. Further, the angle θ formed by the side face of the projection 21 is defined as the angle on a space side in the specific cell 2a as observed from an inflow end face side among the angles formed by the surface of the partition wall 1 and the side faces of the projection 21. The angle θ formed by one side face of the projection 21 and the angle θ formed by the other side face of the projection 21 may be the same angle or different angles. If the angle θ formed by one side face of the projection 21 and the angle θ formed by the other side face of the projection 21 are different, then both angles θ are preferably within the foregoing numerical ranges.

In the cell 2 having the projections 21 projecting therein (i.e., in the specific cell 2a), the heights H2 (the height H2a and the height H2b in FIG. 4 and FIG. 5) of the projections 21 and the opening width H1 of the specific cell 2a in the height direction of the projections 21 preferably satisfy the relationship denoted by expression (1) given below. The following expression (1) is a general expression having the height of the projection 21 denoted by H2. Hence, as shown in FIG. 4 and FIG. 5, if the heights of the projections 21, 21 provided on the partition walls 1 opposed to each other are denoted by the height H2a and the height H2b, then the values of H2a and H2b are substituted into H2 of the following expression (1) to determine whether the following expression (1) is satisfied.

$$15\% \leq H2/H1 \times 100\% \leq 40\%$$  Expression (1):

If the value of "H2/H1×100%" of expression (1) is below 15%, then the space in the specific cell 2a is not adequately divided by the projections 21, and a gas flow will be locally concentrated in one specific cell 2a, thus leading to deterioration of emissions in some cases especially under a high load during a driving mode travel of an automobile. A value of "H2/H1×100%" of expression (1) that exceeds 40% is undesirable, because a pressure loss increases. A value of "H2/H1×100%" particularly preferably ranges from 15 to 30%. The heights H2a and H2b of the projections 21 refer to the shortest distance from the vertex of each of the projections 21 (the highest point of each of the projections 21) to the base of each of the projections 21 in a section that is orthogonal to the direction in which the cells 2 extend. Further, the opening width H1 of the specific cell 2a in the height direction of the projections 21 refers to the distance between the partition walls 1 opposed to each other. In other words, the opening width H1 of the specific cell 2a does not include the thickness of the substantial part of the partition walls 1. The opening width H1 of the specific cell 2*a* may be referred to simply as "the opening width H1 of the cell 2."

In the specific cell 2*a*, a pair of projections 21, 21 is preferably configured as described below. First, in the specific cell 2*a*, a point at which a perpendicular is drawn down to a first side from a central part in the width direction of the top part 25 of the projection 21 provided on the first side constituting the specific cell 2*a* is denoted by P. Further, distances from the point of P to other sides disposed at both ends of the first side among the sides constituting the specific cell 2*a* are denoted by L1 and L2 (provided that L1≥L2). Further, a point at which a perpendicular is drawn down to a second side from the central part in the width direction of the top part 25 of the projection 21 provided on the second side opposed to the first side is denoted by Q. Further, distances from the point of Q to other sides disposed at both ends of the second side among the sides constituting the specific cell 2*a* are denoted by L3 and L4 (provided that L3≥L4). In this case, the pair of projections 21, 21 preferably satisfies the relationship represented by expression (2) given below.

$$L2/L1+L4/L3 \geq 1 \quad \text{Expression (2):}$$

The pair of projections 21, 21 configured to satisfy the relationship of the foregoing expression (2) increases the overlap of the top parts 25 of the pair of projections 21, 21 at the position on the central part side of the specific cell 2*a*, and the temperature rise performance of the honeycomb structure 100 is expected to be further improved. The maximum value of "L2/L1+L4/L3" of the foregoing expression (2) is 2. More specifically, the maximum value is reached when the value of "L2/L1" is 1 and the value of "L4/L3" is 1. The value of "L2/L1+L4/L3" is preferably 1.0 or more, and particularly preferably 1.5 or more.

Referring to FIG. 5, the values of the distance L1 and the distance L2 are substantially equal, and the value of L2/L1 can be said to be 1. Further, the values of the distance L3 and the distance L4 are also substantially equal, and the value of L4/L3 can be said to be 1. Therefore, in the conformation shown in FIG. 5, the value of "L2/L1+L4/L3" represented by expression (2) can be said to be 2.

There is no particular restriction on the value of "L2/L1" and the value of "L4/L3." For example, the value of "L2/L1" and the value of "L4/L3" are preferably, for example, 0.1 or more.

Figure 6:
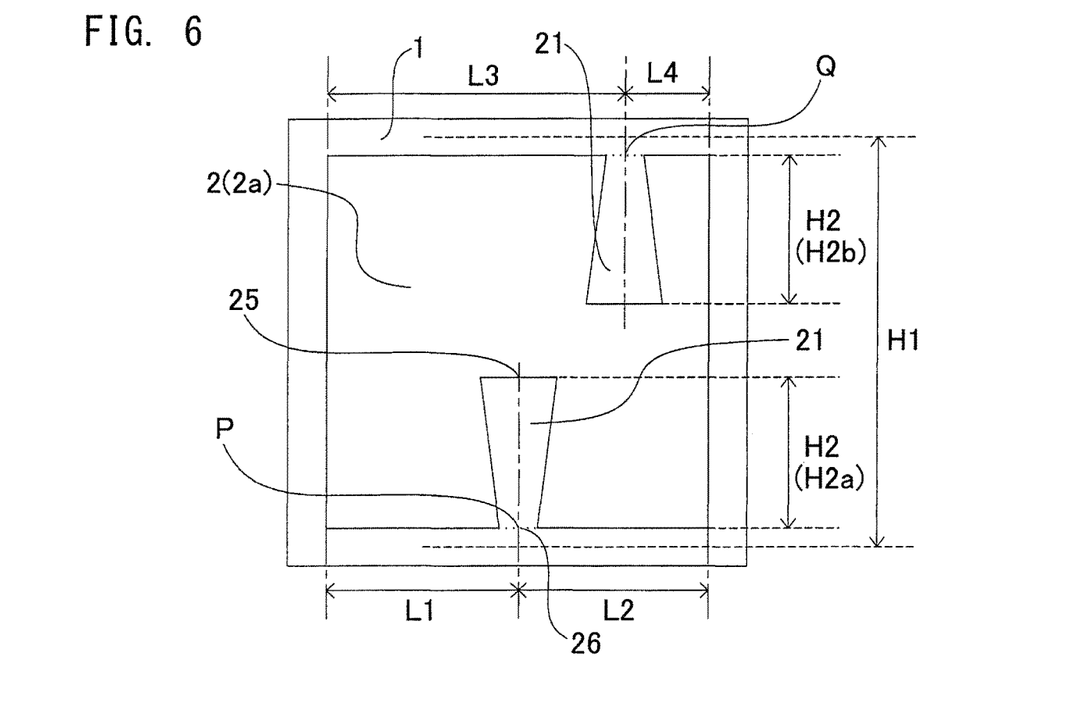
FIG. 6 is an enlarged plan view schematically showing, in an enlarged view, a part of the inflow end face of another embodiment of the honeycomb structure in accordance with the present invention.

Referring now to FIG. 6, a description will be given of another embodiment of the honeycomb structure in accordance with the present invention. FIG. 6 is an enlarged plan view schematically showing, in an enlarged view, a part of the inflow end face of another embodiment of the honeycomb structure in accordance with the present invention. In FIG. 6, like constituent elements as the constituent elements shown in FIG. 5 will be assigned like reference numerals and the descriptions thereof will be omitted.

In FIG. 6, the positions where a pair of projections 21, 21 is placed in a specific cell 2*a* are different from those of the conformation shown in FIG. 5. For example, in FIG. 6, a distance L1 and a distance L2 have substantially equal values, and the value of L2/L1 can be said to be 1. Further, a distance L3 is a distance that is approximately 3.4 times a distance L4, and the value of L4/L3 can be said to be approximately 0.3. Therefore, in the conformation shown in FIG. 6, the value of "L2/L1+L4/L3" represented by expression (2) can be said to be approximately 1.3.

Figure 7:
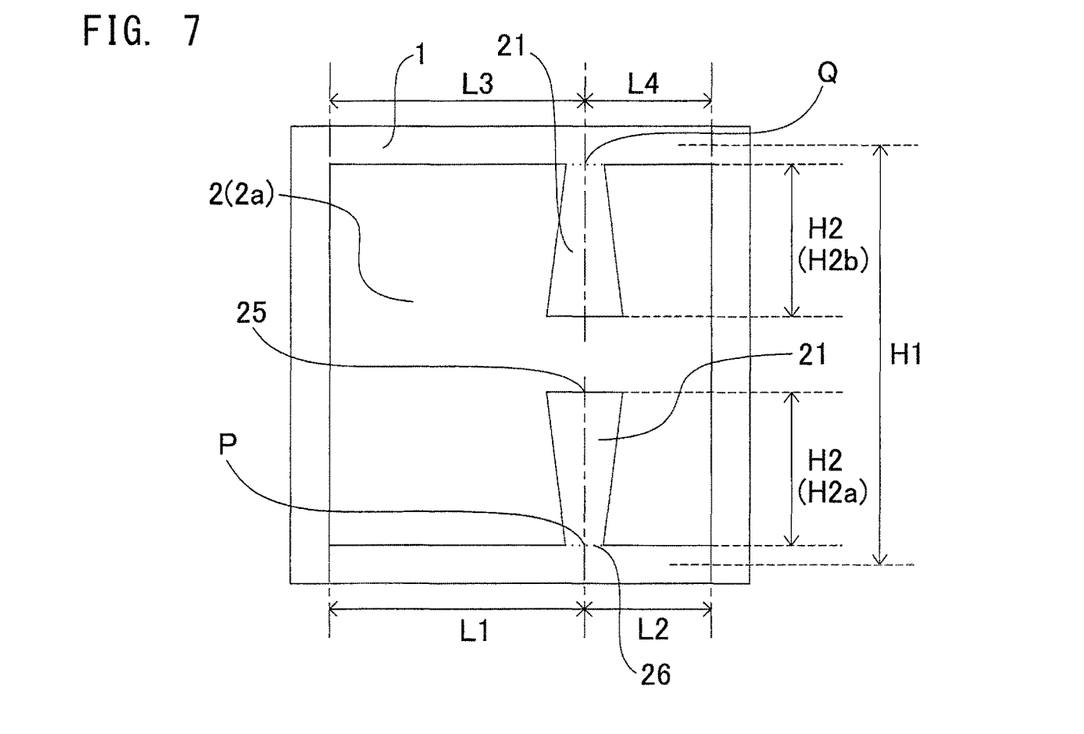
FIG. 7 is an enlarged plan view schematically showing, in an enlarged view, a part of the inflow end face of still another embodiment of the honeycomb structure in accordance with the present invention.
Figure 8:
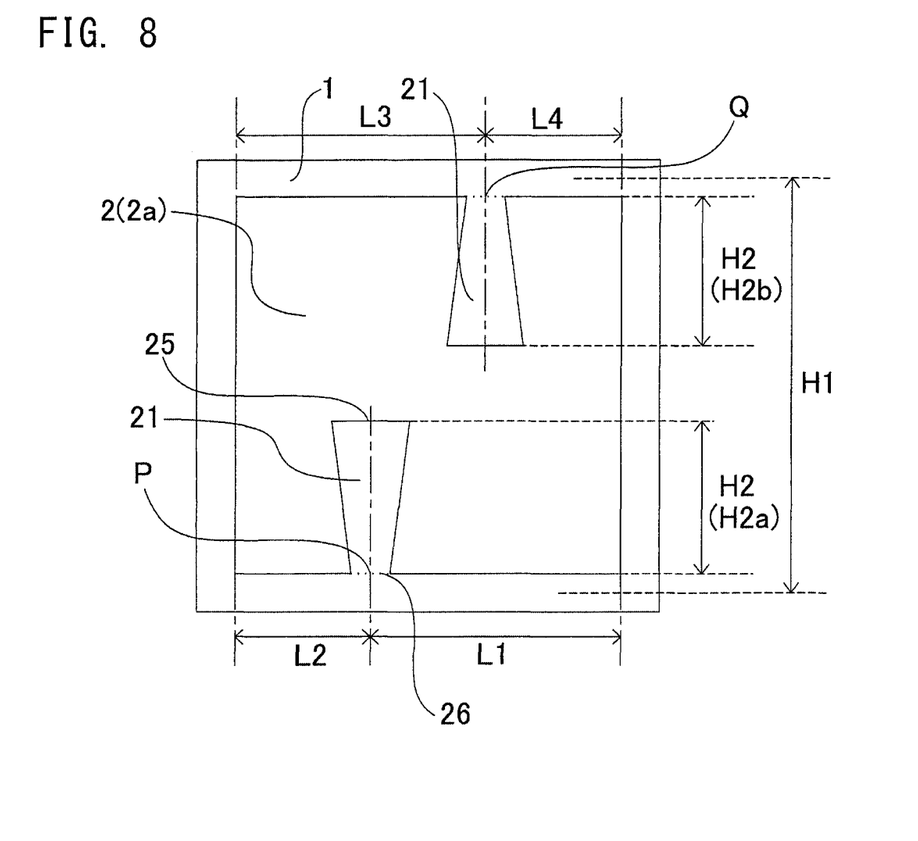
FIG. 8 is an enlarged plan view schematically showing, in an enlarged view, a part of the inflow end face of yet another embodiment of the honeycomb structure in accordance with the present invention.

Referring now to FIG. 7 and FIG. 8, a description will be given of still another embodiment of the honeycomb structure in accordance with the present invention. FIG. 7 and FIG. 8 are enlarged plan views schematically showing, in enlarged views, a part of an inflow end face of still another embodiment of the honeycomb structure in accordance with the present invention. In FIG. 7 and FIG. 8, like constituent elements as the constituent elements shown in FIG. 5 will be assigned like reference numerals, and the descriptions thereof will be omitted.

In each of FIG. 7 and FIG. 8, the positions where a pair of projections 21, 21 is placed in a specific cell 2*a* are also different from those of the conformation shown in FIG. 5. For example, in FIG. 7, a distance L1 is a distance that is approximately double a distance L2, and the value of L2/L1 can be said to be approximately 0.5. Further, a distance L3 is a distance that is approximately double a distance L4, and the value of L4/L3 can be said to be approximately 0.5. Therefore, in the conformation shown in FIG. 7, the value of "L2/L1+L4/L3" represented by expression (2) can be said to be approximately 1.

Referring to FIG. 8, of the pair of projections 21, 21 in the specific cell 2*a*, the projection 21 positioned on the lower side on the paper is positioned to the left on the paper, while the projection 21 positioned on the upper side on the paper is positioned to the right on the paper. As described above, one of the conditions in expression (2) requires that the relationship of L1≥L2 be satisfied when the distance L1 and the distance L2 are defined, or the relationship of L3≥L4 be satisfied when the distance L3 and the distance L4 are defined. In FIG. 8, the distance L1 is also approximately double the distance L2, and the value of L2/L1 can be said to be approximately 0.5. Further, the distance L3 is approximately double the distance L4, and the value of L4/L3 can be said to be approximately 0.5. Hence, also in the conformation shown in FIG. 8, the value of "L2/L1+L4/L3" represented by expression (2) can be said to be approximately 1. The placement of the pair of projections 21, 21 in the specific cell 2*a* is not limited to the conformation shown in FIG. 6 to FIG. 8, and the positions thereof may be changed in various manners.

The rest of the configuration of the honeycomb structure according to the present embodiment will be further described with reference to FIG. 1 to FIG. 5. In the honeycomb structure 100 according to the present embodiment, the width W1 of the top part 25 of the projection 21 is preferably 0.0127 to 0.203 mm and particularly preferably 0.0381 to 0.1524 mm. A width W1 of the top part 25 of the projection 21 that is below the lower limit of the foregoing range is not preferable, because the machining cost of dies and the difficulty level of manufacture would be higher. A width W1 of the top part 25 of the projection 21 that exceeds the upper limit value of the foregoing range is not preferable, because the purifying efficiency would deteriorate with a resultant increase in pressure loss.

There is no particular restriction on the shape of the projections 21 in the section that is orthogonal to the direction in which the cells 2 extend. For example, the shape of the projection 21 may be a line-symmetrical inverted trapezoid (i.e., an isosceles inverted trapezoid) having the top part 25 as the upper base and the bottom part 26 as the lower base as shown in FIG. 4 and FIG. 5, or may be different shapes other than the isosceles inverted trapezoid, although not shown.

The thickness of each of the partition walls 1 is preferably 0.05 to 0.153 mm and particularly preferably 0.05 to 0.110 ram. If the thickness of the partition wall 1 is below the lower limit value, then the mechanical strength may be insufficient. If the thickness of the partition wall 1 exceeds the upper limit value, the pressure loss of the honeycomb structure 100 may increase. The thickness of the partition wall 1 refers to the thickness of a portion thereof where the projection 21 is not provided.

There is no particular restriction on the materials of the partition walls 1. For example, the material preferably uses ceramics as a main component. To be specific, the material is preferably at least one selected from a group that includes silicon carbide, silicon-silicon carbide based composite material, cordierite, mullite, alumina, aluminum titanate, silicon nitride, and silicon carbide-cordierite based composite material.

There is no particular restriction on the shape of the cells 2 insofar as the shape is a polygon having two opposed sides. For example, the shape of the cells 2 may be a polygon, such as a quadrangle, a pentagon, a hexagon or an octagon. In the honeycomb structure body 10, the cells 2 having different shapes may be mixed. For example, quadrangular cells 2 and the hexagonal or octagonal cells 2 may be mixed in one honeycomb structure body 10. In the present specification, the term "the shape of the cells 2" means, in the specific cells 2a, the shape of the cells 2 in the case where there is no projection 21. Further, the term "the shape of the cells 2 being polygonal" refers to a concept that the shape of the cells 2 includes a shape equivalent to a polygon. The shape of the cells 2 is preferably a shape in which the two opposed sides provided with the projections 21, 21 are parallel.

The circumferential wall 20 is a wall provided, enclosing the partition walls 1. The circumferential wall 20 may be formed integrally with the partition walls 1.

The thickness of the circumferential wall 20 is preferably 0.1 to 0.6 mm, and particularly preferably 0.1 to 0.3 mm. If the thickness of the circumferential wall 20 is below the lower limit value, then the mechanical strength may deteriorate. If the thickness of the circumferential wall 20 exceeds the upper limit value, then a large space may be required to accommodate the honeycomb structure 100.

The cell density of the honeycomb structure 100 is preferably 31 to 155 cells/cm$^2$, and particularly preferably 43 to 148 cells/cm$^2$. If the cell density is below the lower limit value, then the strength may not be maintained. If the cell density exceeds the upper limit value, then the pressure loss of the honeycomb structure 100 may increase.

There is no particular restriction on the quantity of the projections 21 in one specific cell 2a. However, in the partition walls surrounding one specific cell 2a, a pair of projections 21, 21 is provided on the partition walls 1 constituting the two opposed sides having the specific cell 2a sandwiched therebetween, so that the lower limit value of the quantity of the projections 21 in one specific cell 2a is two. For example, the quantity of the projections 21 in one cell 2 is preferably two per cell in order to suppress an increase in the pressure loss of the honeycomb structure 100.

(2) Manufacturing Method of the Honeycomb Structure:

The honeycomb structure in accordance with the present invention can be manufactured by a method having a honeycomb forming process and a firing process. The following will describe the processes.

(2-1) Honeycomb Forming Process:

In this process, a ceramic forming raw material that contains a ceramic raw material is formed into a honeycomb formed body having partition walls arranged, surrounding a plurality of cells that provide the flow channels of a fluid.

The ceramic raw material contained in the ceramic forming raw material is preferably at least one selected from a group including a cordierite forming raw material, cordierite, silicon carbide, a silicon-silicon carbide based composite material, mullite, and aluminum titanate. The cordierite forming raw material is a ceramic raw material mixed to have a chemical composition in which silica falls within the range of 42 to 56 mass percent, alumina falls within the range of 30 to 45 mass percent, and magnesia falls within the range of 12 to 16 mass percent. The cordierite forming raw material is fired into cordierite.

Further, the ceramic forming raw material can be prepared by mixing a dispersing medium, an organic binder, an inorganic binder, a pore former, a surfactant or the like into the foregoing ceramic raw material. There is no particular restriction on the composition ratio of each raw material, and the composition ratio is preferably determined on the basis of the structure, the material and the like of a honeycomb structure to be manufactured.

To form a ceramic forming raw material, the ceramic forming raw material is first kneaded into a kneaded material, and the obtained kneaded material is formed into a honeycomb shape. The ceramic forming raw material is kneaded into the kneaded material by a method using, for example, a kneader, a vacuum pugmill or the like. As a method for forming the kneaded material into a honeycomb formed body, a publicly known forming method, such as extrusion or injection molding, can be used.

Specifically, a method in which a die is used to form a honeycomb formed body by extrusion can be applied as a preferred example. The material of the die is preferably a cemented carbide, which is resistant to abrasion.

The die manufactured as described below is preferably used. First, a die (a conventional die) is prepared, which is used to manufacture a conventional publicly known honeycomb structure having no projection. Then, a region that is complementary to a projection (a region which turns into a projection by the entry of the kneaded material) is formed toward the die main body of the conventional die through a slit (a clearance for forming partition walls) of the conventional die. The foregoing "region that is complementary to a projection" can be formed by, for example, carrying out electrical discharge machining or the like on the die main body of the conventional die. Thus, the predetermined die can be manufactured.

The honeycomb formed body having the projections that satisfy the conditions of the honeycomb structure in accordance with the present invention can be easily manufactured by using the die described above.

There is no particular restriction on the shape of the honeycomb formed body, and the shape may be round pillar-shaped, elliptic pillar-shaped, or polygonal pillar-shaped having an end face that is square, rectangular, triangular, pentagonal, hexagonal, octagonal or the like.

Further, after the foregoing forming process, the obtained honeycomb formed body can be dried. There is no particular restriction on the drying method. For example, hot air drying, microwave drying, dielectric drying, reduced pressure drying, vacuum drying, freeze drying, or the like can be used. Among these drying methods, the dielectric drying, the microwave drying or the hot air drying is preferably carried out alone or in combination.

(2-2) Firing Process

Subsequently, the honeycomb formed body is fired to manufacture a honeycomb fired body. The honeycomb formed body is fired to sinter the forming raw material constituting the honeycomb formed body to densify the forming raw material so as to secure predetermined strength. The firing conditions (temperature, time, atmosphere and the like) vary according to the type of the forming raw material, so that appropriate conditions may be selected according to the type. For example, if a cordierite forming raw material is used, then the firing temperature is preferably 1410 to 1440° C. Further, the firing time is preferably 4 to 8 hours during which a maximum temperature is maintained. As a firing device, an electric furnace, a gas furnace or the like can be used. The honeycomb fired body obtained as described above can be used as the honeycomb structure in accordance with the present invention. The manufacturing method for the honeycomb structure may further include a circumferential coating process as described below.

(2-3) Circumferential Coating Process

In this process, a circumferential coating material is applied to the circumference of the obtained honeycomb fired body to form a circumferential wall. The circumferential wall may be formed integrally with the partition walls when manufacturing the honeycomb formed body. Forming the additional circumferential wall by the circumferential coating process makes it possible to prevent the honeycomb structure from chipping when an external force is applied to the honeycomb structure.

A circumferential coating material is obtained, for example, by adding water to a mixture prepared by adding an additive, such as an organic binder, a foamable resin, a dispersing agent or the like to an inorganic raw material, such as an inorganic fiber, colloidal silica, clay, or SiC particles, and then kneading the mixture. As a method for applying a circumferential coating material, a method may be used, in which, for example, "a cut honeycomb fired body" is rotated on a pottery wheel and coated with a circumferential coating material by a rubber spatula or the like.

EXAMPLES

The following will describe the present invention further specifically by means of examples; however, the present invention is not at all limited by the examples.

Example 1

In example 1, the forming raw material for manufacturing honeycomb structures was first prepared. More specifically, a binder, a surfactant, a pore former, and water were added to a ceramic raw material to prepare the forming raw material. As the ceramic raw material, kaolin, talc, and alumina, which are cordierite forming raw materials, were used.

Subsequently, the obtained forming raw material was kneaded by a kneader and then soil-kneaded by a vacuum pugmill to form a kneaded material. Next, the obtained kneaded material was extruded using a die, thereby manufacturing the honeycomb formed body. The die used was the one having a region complementary to a projection (the region which turns into a projection by the entry of the kneaded material). The honeycomb formed body after being fired had a partition wall thickness of 0.089 mm and a cell density of 62 cells/cm². The cells of the honeycomb formed body were formed to have a quadrangular shape. The honeycomb formed body was formed to be round pillar-shaped. The diameter of each of the end faces of the round pillar-shaped honeycomb formed body was set such that the diameter was 103 mm after the firing process. Further, the length of the honeycomb formed body in the direction in which the cells extend was set such that the length was 84 mm after the firing process. The foregoing die used was designed such that the manufactured honeycomb structure satisfied the conditions shown in Table 1.

Subsequently, the honeycomb formed body was dried to obtain a honeycomb dried body. In the drying process, the microwave drying was first carried out and then the hot air drying was carried out at a hot air temperature of 120° C. for two hours. Thereafter, both end portions of the honeycomb dried body were cut.

Subsequently, the obtained honeycomb dried body was degreased. The degreasing was carried out at 450° C. for five hours. Then, the degreased honeycomb dried body was fired to obtain a honeycomb fired body. The firing was carried out at 1425° C. for seven hours in the atmosphere. The time for increasing the temperature from 1200 to 1425° C. was set to five hours. Thus, the honeycomb structure of example 1 was manufactured.

As shown in FIG. 4 and FIG. 5, the honeycomb structure of example 1 had the projection 21 on each of the partition walls 1 constituting two opposed sides sandwiching therebetween the cell 2, which had a quadrangular sectional shape. In other words, the quantity of the projections 21 per cell 2 was two per cell in the honeycomb structure of example 1. The quantity of projections per cell is shown in the column of "Q'ty of projections (projections/cell)" of Table 1.

In the honeycomb structure of example 1, the height H2 of the projections was 0.18 mm. The width W1 of the top part of each projection was 0.142 mm, and the width W2 of the bottom part of the projection was 0.128 mm. The ratio between the width W1 of the top part of the projection and the width W2 of the bottom part of the projection (W1:W2) was 1:0.9, and the value of W2/W1, which is the value obtained by dividing W2 by W1 was 0.9. Further, in the honeycomb structure of example 1, the opening width H1 of each cell was 1.18 mm. Hence, the value of "H2/H1×100%" was 15.3%. The height H2 of the projection, the width W1 of the top part of the projection, the width W2 of the bottom part of the projection, and the opening width H1 of each cell were determined according to the method described below. First, a first end face of the honeycomb structure was imaged using a Profile Projector made by Mitutoyo Corporation. Then, the obtained image was subjected to an image analysis performed by image analysis software made by Mitutoyo Corporation so as to determine the values described above. For each measurement, a captured image was enlarged to a desired magnification, as appropriate, before performing measurement. In the image analysis, the image captured by the Profile Projector was subjected to binarization processing, and the measurement function of the image analysis software was used to perform each measurement and to check the measurement result thereof. The results are shown in Table 1.

Further, the images captured by the foregoing Profile Projector were used to measure a distance L1, a distance L2, a distance L3, and a distance L4 as shown in FIG. 5. Based on the determined values of the distance L1, the distance L2, the distance L3, and the distance L4, the value of "L2/L1+L4/L3" (provided that L1≥L2 and L3≥L4) was calculated. In the honeycomb structure of example 1, the value of "L2/L1+L4/L3" was 2.0. The value of "L2/L1" was 1.0. Hereinafter, the value of "L2/L1+L4/L3" may be referred to as "the L ratio." The measurement results of the L ratio are shown in the column of "L ratio; (L2/L1+L4/L3)" of Table 1. Further, the values of "L2/L1" are shown in the column of "L2/L1" of Table 1.

Further, on the manufactured honeycomb structure, the thickness of each partition wall (mm) and the cell density (cells/cm²) were measured by using the Profile Projector and the image analysis software described above. The results are shown in Table 1.

eycomb structure that has the same projection height H2 and the same L ratio as those of a honeycomb structure to be evaluated among the honeycomb structures of comparative

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Thickness of partition wall (mm) | 0.089 | 0.089 | 0.089 | 0.089 | 0.089 | 0.089 | 0.089 | 0.089 | 0.089 | 0.089 |
| Cell density (cells/cm²) | 62 | 62 | 62 | 62 | 62 | 62 | 62 | 62 | 62 | 62 |
| Opening width H1 (mm) | 1.18 | 1.18 | 1.18 | 1.18 | 1.18 | 1.18 | 1.18 | 1.18 | 1.18 | 1.18 |
| Q'ty of projections (projections/cell) | 2 | 2 | 2 | 2 | 2 | 2 | 2 | 2 | 2 | 2 |
| Projection height H2 (mm) | 0.18 | 0.18 | 0.18 | 0.47 | 0.47 | 0.47 | 0.18 | 0.18 | 0.18 | 0.47 |
| H2/H1 × 100(%) | 15.3 | 15.3 | 15.3 | 39.8 | 39.8 | 39.8 | 15.3 | 15.3 | 15.3 | 39.8 |
| Projection top part width W1 (mm) | 0.142 | 0.142 | 0.142 | 0.142 | 0.142 | 0.142 | 0.180 | 0.180 | 0.180 | 0.180 |
| Projection bottom part width W2 (mm) | 0.128 | 0.128 | 0.128 | 0.128 | 0.128 | 0.128 | 0.090 | 0.090 | 0.090 | 0.090 |
| W1:W2 | 1:0.9 | 1:0.9 | 1:0.9 | 1:0.9 | 1:0.9 | 1:0.9 | 1:0.5 | 1:0.5 | 1:0.5 | 1:0.5 |
| W2/W1 | 0.9 | 0.9 | 0.9 | 0.9 | 0.9 | 0.9 | 0.5 | 0.5 | 0.5 | 0.5 |
| L ratio; (L2/L1 + L4/L3) | 2.0 | 1.0 | 1.0 | 2.0 | 1.0 | 1.0 | 2.0 | 1.0 | 1.0 | 2.0 |
| L2/L1 | 1.0 | 0.5 | 0.8 | 1.0 | 0.5 | 0.8 | 1.0 | 0.5 | 0.8 | 1.0 |
| Pressure loss (kPa) | 2.10 | 2.10 | 2.10 | 3.10 | 3.10 | 3.10 | 2.18 | 2.18 | 2.18 | 3.25 |
| Evaluation of pressure loss | A | A | A | A | A | A | B | B | B | B |
| Temperature rise performance (° C.) | 92 | 86 | 86 | 102 | 96 | 96 | 107 | 101 | 101 | 122 |
| Evaluation of temperature rise performance | B | B | B | B | B | B | A | A | A | A |
| Overall evaluation | OK | OK | OK | OK | OK | OK | OK | OK | OK | OK |

On the honeycomb structure of example 1, the measurement of the pressure loss (kPa) and the measurement of the temperature rise performance (° C.) were carried out according to the following method. Table 1 shows the measurement results of the pressure loss (kPa) and the evaluation results thereof, as well as the measurement results of the temperature rise performance (° C.) and the evaluation results thereof. Further, the following overall evaluations were carried out on the basis of all the evaluation results. The evaluations are shown in Table 1.

(Pressure Loss (kPa))

On the manufactured honeycomb structures, the pressure losses were measured using a large wind tunnel testing machine. At that time, the gas temperature was set to 25° C., and the gas flow rate was set to 10 Nm³/min. Further, the same method was used to measure the pressure losses of the honeycomb structures of comparative examples 1 to 5 as the honeycomb structures that provide evaluation standards. The "honeycomb structure that provides the evaluation standard" will be discussed later. The pressure losses of the honeycomb structures providing the evaluation standards were defined as the reference pressure losses, and the value of the pressure loss of each honeycomb structure was evaluated according to the following standard. With respect to the reference pressure losses, if an increase in the pressure loss was +5% or less, then the evaluation result was denoted by "A," if an increase in the pressure loss was over +5% but +10% or less, then the evaluation result was denoted by "B," and if an increase in the pressure loss exceeded +10%, then the evaluation result was denoted by "C." The evaluation results A and B indicate pass. This is because outputs deteriorate if an increase in the pressure loss exceeds +10%.

The "honeycomb structure that provides the evaluation standard" in the evaluations of the pressure loss is a honexamples 1 to 5. For example, the honeycomb structure that provides the evaluation standard for the honeycomb structure of example 1 is the honeycomb structure of comparative example 1. Hence, in the honeycomb structure of example 1, the reference pressure loss is 2.00 kPa. Exceptionally, the honeycomb structure that provides the evaluation standard for the honeycomb structure of example 14 is the honeycomb structure of comparative example 1. Further, the honeycomb structure that provides the evaluation standard for the honeycomb structure of example 15 is the honeycomb structure of comparative example 3.

(Temperature Rise Performance (° C.))

The temperature rise performance of the manufactured honeycomb structure of each example was measured using a burner tester. First, a couple for measuring temperatures was placed adjacently to an inflow end face side, which is a gas inflow side, of the honeycomb structure to be measured. The couple was placed by being inserted at the position of a cell that is 5 mm from the inflow end face, the cell being positioned at the center of the inflow end face. Then, the honeycomb structure with the couple placed was set on the burner tester. Next, a gas was passed on a bypass side of the burner tester such that the gas temperature was 293° C. and the gas flow rate was 3.18 m/s. When both the gas temperature and the gas flow rate were stabilized, the gas was passed to the honeycomb structure set on the burner tester, and the temperature of the foregoing couple was measured at one second after the start of the passage of the gas. Further, the temperature measurement was carried out by the same method also on the honeycomb structures of comparative examples 1 to 5, which provide the evaluation standards. With respect to the temperatures of the honeycomb structures providing the evaluation standards, if the temperatures of the honeycomb structures exceeded +15° C., then the evaluation results were denoted by "A," if the temperatures thereof were over +10° C. but +15° C. or less, then the evaluation results were denoted by "B," and if the temperatures thereof were +10° C. or less, then the evaluation results were denoted by "C." The honeycomb structures providing the evaluation standards were the same as those used for evaluating the pressure losses.

(Overall Evaluation)

Based on the evaluations of the pressure losses and the evaluations of the temperature rise performance, overall evaluations were carried out according to the following evaluation standards. If both the evaluation of the pressure loss and the temperature rise performance were "A" or "B," then the overall evaluation was "OK." If not, then the evaluation was "NG." More specifically, if at least one of the evaluation of the pressure loss and the evaluation of the temperature rise performance was "C," then "NG" was applied.

Examples 2 to 15

The honeycomb structures were manufactured according to the same method as that for example 1 except that the thickness of the partition wall and the configuration of the projection were changed as shown in Table 1 and Table 2. On the honeycomb structures of examples 2 to 15 also, the measurement of the pressure loss, the measurement of the temperature rise performance, and the evaluations thereof were carried out according to the same method as that for example 1. The results are shown in Table 1 and Table 2.

Comparative Examples 1 to 14

The honeycomb structures were manufactured according to the same method as that for example 1 except that the thickness of the partition wall and the configuration of the projection were changed as shown in Table 3 and Table 4. On the honeycomb structures of comparative examples 1 to 14 also, the measurement of the pressure loss, the measurement of the temperature rise performance, and the evaluations thereof were carried out according to the same method as that for example 1. The results are shown in Table 3 and Table 4.

TABLE 2

|  | Example 11 | Example 12 | Example 13 | Example 14 | Example 15 |
|---|---|---|---|---|---|
| Thickness of partition wall (mm) | 0.089 | 0.089 | 0.089 | 0.089 | 0.089 |
| Cell density (cells/cm$^2$) | 62 | 62 | 62 | 62 | 62 |
| Opening width H1 (mm) | 1.18 | 1.18 | 1.18 | 1.18 | 1.18 |
| Q'ty of projections (projections/cell) | 2 | 2 | 2 | 2 | 2 |
| Projection height H2 (mm) | 0.47 | 0.47 | 0.18 | 0.17 | 0.50 |
| H2/H1 × 100(%) | 39.8 | 39.8 | 15.3 | 14.8 | 42.0 |
| Projection top part width W1 (mm) | 0.180 | 0.180 | 0.142 | 0.142 | 0.142 |
| Projection bottom part width W2 (mm) | 0.090 | 0.090 | 0.128 | 0.128 | 0.128 |
| W1:W2 | 1:0.5 | 1:0.5 | 1:0.9 | 1:0.9 | 1:0.9 |
| W2/W1 | 0.5 | 0.5 | 0.9 | 0.9 | 0.9 |
| L ratio; (L2/L1 + L4/L3) | 1.0 | 1.0 | 0.8 | 2.0 | 2.0 |
| L2/L1 | 0.5 | 0.8 | 0.4 | 1.0 | 1.0 |
| Pressure loss (kPa) | 3.25 | 3.25 | 2.10 | 2.08 | 3.18 |
| Evaluation of pressure loss | B | B | A | A | B |
| Temperature rise performance (° C.) | 116 | 116 | 83 | 91 | 103 |
| Evaluation of temperature rise performance | A | A | B | B | B |
| Overall evaluation | OK | OK | OK | OK | OK |

TABLE 3

|  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 |
|---|---|---|---|---|---|---|---|---|---|---|
| Thickness of partition wall (mm) | 0.089 | 0.089 | 0.089 | 0.089 | 0.089 | 0.089 | 0.089 | 0.089 | 0.089 | 0.089 |
| Cell density (cells/cm$^2$) | 62 | 62 | 62 | 62 | 62 | 62 | 62 | 62 | 62 | 62 |
| Opening width H1 (mm) | 1.18 | 1.18 | 1.18 | 1.18 | 1.18 | 1.18 | 1.18 | 1.18 | 1.18 | 1.18 |
| Q'ty of projections (projections/cell) | 2 | 2 | 2 | 2 | 2 | 2 | 2 | 2 | 2 | 2 |
| Projection height H2 (mm) | 0.18 | 0.18 | 0.47 | 0.47 | 0.18 | 0.18 | 0.18 | 0.47 | 0.47 | 0.18 |
| H2/H1 × 100(%) | 15.3 | 15.3 | 39.8 | 39.8 | 15.3 | 15.3 | 15.3 | 39.8 | 39.8 | 15.3 |
| Projection top part width W1 (mm) | 0.135 | 0.135 | 0.135 | 0.135 | 0.135 | 0.141 | 0.141 | 0.141 | 0.141 | 0.141 |
| Projection bottom part width W2 (mm) | 0.135 | 0.135 | 0.135 | 0.135 | 0.135 | 0.129 | 0.129 | 0.129 | 0.129 | 0.129 |
| W1:W2 | 1:1 | 1:1 | 1:1 | 1:1 | 1:1 | 1:0.92 | 1:0.92 | 1:0.92 | 1:0.92 | 1:0.92 |
| W2/W1 | 1 | 1 | 1 | 1 | 1 | 0.92 | 0.92 | 0.92 | 0.92 | 0.92 |
| L ratio; (L2/L1 + L4/L3) | 2.0 | 1.0 | 2.0 | 1.0 | 0.8 | 2.0 | 1.0 | 2.0 | 1.0 | 0.8 |
| L2/L1 | 1.0 | 0.5 | 1.0 | 0.5 | 0.4 | 1.0 | 0.5 | 1.0 | 0.5 | 0.4 |
| Pressure loss (kPa) | 2.00 | 2.00 | 3.00 | 3.00 | 2.00 | 2.05 | 2.05 | 3.05 | 3.05 | 2.05 |
| Evaluation of pressure loss | — | — | — | — | — | A | A | A | A | A |
| Temperature rise performance (° C.) | 80 | 75 | 90 | 85 | 73 | 88 | 82 | 98 | 92 | 79 |

TABLE 3-continued

| | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 | Comp. Example 10 |
|---|---|---|---|---|---|---|---|---|---|---|
| Evaluation of temperature rise performance | — | — | — | — | — | C | C | C | C | C |
| Overall evaluation | — | — | — | — | — | NG | NG | NG | NG | NG |

TABLE 4

| | Comp. Example 11 | Comp. Example 12 | Comp. Example 13 | Comp. Example 14 |
|---|---|---|---|---|
| Thickness of partition wall (mm) | 0.089 | 0.089 | 0.089 | 0.089 |
| Cell density (cells/cm$^2$) | 62 | 62 | 62 | 62 |
| Opening width H1 (mm) | 1.18 | 1.18 | 1.18 | 1.18 |
| Q'ty of projections (projections/cell) | 2 | 2 | 2 | 2 |
| Projection height H2 (mm) | 0.18 | 0.18 | 0.47 | 0.47 |
| H2/H1 × 100(%) | 15.3 | 15.3 | 39.8 | 39.8 |
| Projection to part width W1 (mm) | 0.182 | 0.182 | 0.182 | 0.182 |
| Projection bottom part width W2 (mm) | 0.088 | 0.088 | 0.088 | 0.088 |
| W1:W2 | 1:0.48 | 1:0.48 | 1:0.48 | 1:0.48 |
| W2/W1 | 0.48 | 0.48 | 0.48 | 0.48 |
| L ratio; (L2/L1 + L4/L3) | 2.0 | 1.0 | 2.0 | 1.0 |
| L2/L1 | 1.0 | 0.5 | 1.0 | 0.5 |
| Pressure loss (kPa) | 2.50 | 2.50 | 3.75 | 3.75 |
| Evaluation of pressure loss | C | C | C | C |
| Temperature rise performance (° C.) | 110 | 104 | 125 | 119 |
| Evaluation of temperature rise performance | A | A | A | A |
| Overall evaluation | NG | NG | NG | NG |

(Results)

As shown in Table 1, the honeycomb structures of examples 1 to 15 had lower pressure losses and exhibited higher temperature rise performance, as compared with the honeycomb structures of comparative examples 1 to 5. Thus, the honeycomb structures of examples 1 to 15 exhibited improved temperature rise performance while suppressing an increase in the pressure loss.

Meanwhile, regarding the honeycomb structures of comparative examples 6 to 10, the values of W2/W1 were 0.92, and no good result of the evaluation of the temperature rise performance was obtained. Further, regarding the honeycomb structures of comparative examples of 11 to 14, the values of W2/W1 were 0.48, and no good result of the evaluation of the pressure loss was obtained.

Regarding the honeycomb structure of example 14, the value of "H2/H1×100%" was 14.8%, and it was verified that the temperature rise performance (° C.) tended to slightly decrease. Regarding the honeycomb structure of example 15, the value of "H2/H1×100%" was 42.0%, and it was verified that the pressure loss tended to slightly increase. Regarding the honeycomb structures of comparative examples 5 and 10, and the honeycomb structure of example 13, the L ratio was 1.0 or less, and it was verified that the temperature rise performance (° C.) tended to decrease, as compared with the case where the L ratio was 1.0 or more.

The honeycomb structure in accordance with the present invention can be used as a catalyst carrier for exhaust gas purification whereby to purify an exhaust gas.

DESCRIPTION OF REFERENCE NUMERALS

1: partition wall; 2: cell; 2a: specific cell; 10: honeycomb structure; 11: first end face; 12: second end face; 20: circumferential wall; 21: projection; 25: top part; 26: bottom part; 100: honeycomb structure; H1: opening width (the opening width of a cell); H2, H2a, H2b: height (the height of a projection); L1, L2, L3, L4: distance; P: point (a point at which a perpendicular is drawn down to a first side from the central part in the width direction of the top part of a projection provided on the first side); Q: point (a point at which a perpendicular is drawn down to a second side from the central part in the width direction of the top part of a projection provided on the second side); and θ: angle (an angle formed by a side face of a projection).

What is claimed is:
1. A honeycomb structure comprising:
a pillar-shaped honeycomb structure body having porous partition walls provided, surrounding a plurality of cells which extend from a first end face to a second end face and which form flow channels of a fluid, and a circumferential wall provided, enclosing the porous partition walls,
wherein, a specific cell of the plurality of cells is provided with a pair of projections which project into the specific cell from the porous partition wall, the pair of projections project, in at least a pair of opposed porous partition walls among the porous partition walls constituting the specific cell, into the specific cell from a first side and a second side, and which is provided continuously in a direction in which the specific cell extends, and
in the case where the width of a top part of each projection of the pair of projections is denoted by W1, and the width of a bottom part of each projection of the pair of projections is denoted by W2, W1>W2 holds, and W2/W1, which indicates a value obtained by dividing W2 by W1, is 0.5 to 0.9.
2. The honeycomb structure according to claim 1, wherein a relationship represented by expression (1) given below is satisfied in the case where a height of each projection of the pair of projections is denoted by H2 and an opening width of the specific cell in a height direction of each projection of the pair of projections is denoted by H1 in the specific cell in which each projection of the pair of projections projects:

$$15\% \leq H2/H1 \times 100\% \leq 40\% \qquad \text{Expression (1)}.$$

3. The honeycomb structure according to claim 1, wherein in the case where
a point at which a perpendicular line is drawn down to a first side from a central part in a width direction of the top part of each projection of the pair of projections provided on the first side is denoted by P in the specific cell, distances from the point of P to both ends of the first side are denoted by L1 and L2, wherein L1≥L2, a point at which a perpendicular line is drawn down to a second side from a central part in the width direction of the top part of the projection provided on the second side is denoted by Q, and distances from the point of Q to both ends of the second side are denoted by L3 and L4, wherein L3≥L4, a relationship represented by expression (2) given below is satisfied:

$$L2/L1 + L4/L3 \geq 1 \qquad \text{Expression (2).}$$

4. The honeycomb structure according to claim 1, wherein a thickness of each of the porous partition walls is 0.05 to 0.153 mm.

5. The honeycomb structure according to claim 1, wherein W1, which denotes the width of the top part of each projection of the pair of projections, is 0.0127 to 0.203 mm.

* * * * *